US012333003B2

(12) United States Patent
Koike et al.

(10) Patent No.: US 12,333,003 B2
(45) Date of Patent: Jun. 17, 2025

(54) INFORMATION PROCESSING DEVICE, INFORMATION PROCESSING SYSTEM, AND NON-TRANSITORY COMPUTER READABLE MEDIUM

(71) Applicant: KABUSHIKI KAISHA TOSHIBA, Tokyo (JP)

(72) Inventors: Ryuiti Koike, Kawasaki Kanagawa (JP); Yurie Shinke, Kawasaki Kanagawa (JP); Shinya Takumi, Tokyo (JP); Jun Kanai, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 246 days.

(21) Appl. No.: 17/929,619

(22) Filed: Sep. 2, 2022

(65) Prior Publication Data

US 2023/0237151 A1 Jul. 27, 2023

(30) Foreign Application Priority Data

Jan. 27, 2022 (JP) ................................. 2022-011259

(51) Int. Cl.
 *G06F 21/55* (2013.01)
(52) U.S. Cl.
 CPC ...... *G06F 21/554* (2013.01); *G06F 2221/033* (2013.01)
(58) Field of Classification Search
 CPC ............. G06F 21/554; G06F 2221/033; G06F 21/00–88; G06F 2221/00–2153;
 (Continued)

(56) References Cited

U.S. PATENT DOCUMENTS 8,214,653 B1 7/2012 Marr et al.
8,601,170 B1 * 12/2013 Marr ....................... G06F 21/57
 710/22
(Continued)

FOREIGN PATENT DOCUMENTS

CN 110764811 A * 2/2020 ............. G06F 8/654
CN 111966596 A * 11/2020 .......... G06F 11/3688
(Continued)

OTHER PUBLICATIONS

"Xueyang Wang, Charalambos Konstantinou, Michail Maniatakos, Ramesh Karri, Serena Lee, Patricia Robison, Paul Stergiou, and Steve Kim" , "Malicious Firmware Detection with hardware Performance Counters" , "Jul.-Sep. 2016", "IEEE", "vol. 2", "160-171" (Year: 2016).*

(Continued)

*Primary Examiner* — Michael W Chao
*Assistant Examiner* — Raghavender NMN Cholleti
(74) *Attorney, Agent, or Firm* — Finnegan, Henderson, Farabow, Garrett & Dunner, LLP

(57) ABSTRACT

An information processing device, includes: a metadata generator generating, based on an update request of firmware, first metadata including identification of the firmware; a time manager; a validity period determiner determining a first validity period for the first metadata based on time acquired from the time manager; a counter counting up a value per unit time; an acquirer acquiring a first counter value of the counter for the first metadata; a storage storing entries in which second metadata including identification of firmware, a second validity period of the second metadata, and a second counter value of the counter having been acquired for the second metadata are associated; and a determiner detecting the second metadata including same identification as the first metadata, acquire the second valid- (Continued)

ity period and the second counter value from the entry including the detected second metadata, and detecting falsification of the first validity period.

16 Claims, 16 Drawing Sheets

(58) Field of Classification Search
CPC ....... H04L 9/00–50; H04L 2209/00–88; H04L 63/00–308; H04L 2463/00–146
See application file for complete search history.

(56) References Cited

U.S. PATENT DOCUMENTS

| | | | |
|---|---|---|---|
| 11,222,097 B2 | 1/2022 | Tsuboi | |
| 2005/0036512 A1* | 2/2005 | Loukianov | H04N 21/23608 375/E7.278 |
| 2007/0245417 A1* | 10/2007 | Lee | H04L 63/1458 726/22 |
| 2008/0281625 A1 | 11/2008 | Shiki | |
| 2017/0220404 A1* | 8/2017 | Polar Seminario | G06F 11/0751 |
| 2019/0028273 A1* | 1/2019 | Harras | G06F 21/606 |
| 2019/0102546 A1* | 4/2019 | Cheng | H04L 63/1466 |
| 2020/0104192 A1* | 4/2020 | Siddhartha | G06F 9/542 |
| 2020/0151335 A1* | 5/2020 | Ayoub | H04L 63/0435 |
| 2020/0349009 A1* | 11/2020 | Samuel | G06F 11/1469 |
| 2021/0136082 A1* | 5/2021 | Andrews | H04L 63/105 |
| 2021/0334380 A1* | 10/2021 | Saluja | G06F 21/568 |

FOREIGN PATENT DOCUMENTS

| | | |
|---|---|---|
| JP | 2007-58609 A | 3/2007 |
| JP | 2007-193579 A | 8/2007 |
| JP | 2018-132874 A | 8/2018 |

OTHER PUBLICATIONS

Linux Foundation, "The Update Framework Specification, Version: 1.0.25," J. Cappos, et al., eds., https://theupdateframework.github.io/specification/latest/, 38 pages (Sep. 7, 2021).

Japan Patent Office, Office Action in JP App. No. 2022-011259, 1 page, and machine translation, 2 pages (Oct. 4, 2024).

* cited by examiner

INFORMATION PROCESSING DEVICE, INFORMATION PROCESSING SYSTEM, AND NON-TRANSITORY COMPUTER READABLE MEDIUM

CROSS REFERENCE TO RELATED APPLICATIONS

This application is based upon and claims the benefit of priority from the prior Japanese Patent Application No. 2022-011259, filed on Jan. 27, 2022, the entire contents of which are incorporated herein by reference.

FIELD

Embodiment described herein relates to an information processing device, an information processing system, and a program.

BACKGROUND

In recent years, various devices are being connected to the Internet. Devices connected to the Internet can obtain various advantages such as fine control from the Cloud and execution of overall optimization that is difficult to achieve by a stand-alone device.

A malicious third party attacks a device by exploiting a vulnerability in software of the device. Such an attack on a device is likely to be successful in the long run.

Such devices problematically require continuous and safe updates of software for the purpose of overcoming vulnerabilities.

DETAILED DESCRIPTION

According to one embodiment, an information processing device includes a metadata generator configured to generate, based on an update request of firmware from a device, first metadata including identification information of the firmware; a time manager configured to manage time; a validity period determiner configured to determine a first validity period with respect to the first metadata based on time acquired from the time manager; a counter configured to count up a value per unit time; an acquirer configured to acquire a first counter value being a value of the counter with respect to the first metadata; a storage configured to store one or more entries in which second metadata including identification information of firmware, a second validity period being a validity period of the second metadata, and a second counter value being a value of the counter having been acquired with respect to the second metadata are associated with each other; and a determiner configured to detect the second metadata including same identification information as the first metadata, acquire the second validity period and the second counter value from the entry including the detected second metadata, and detect falsification of the first validity period based on the first counter value and the first validity period and on the second counter value and the second validity period.

Hereinafter, an embodiment of the present invention will be described with reference to the drawings.

Figure 1:
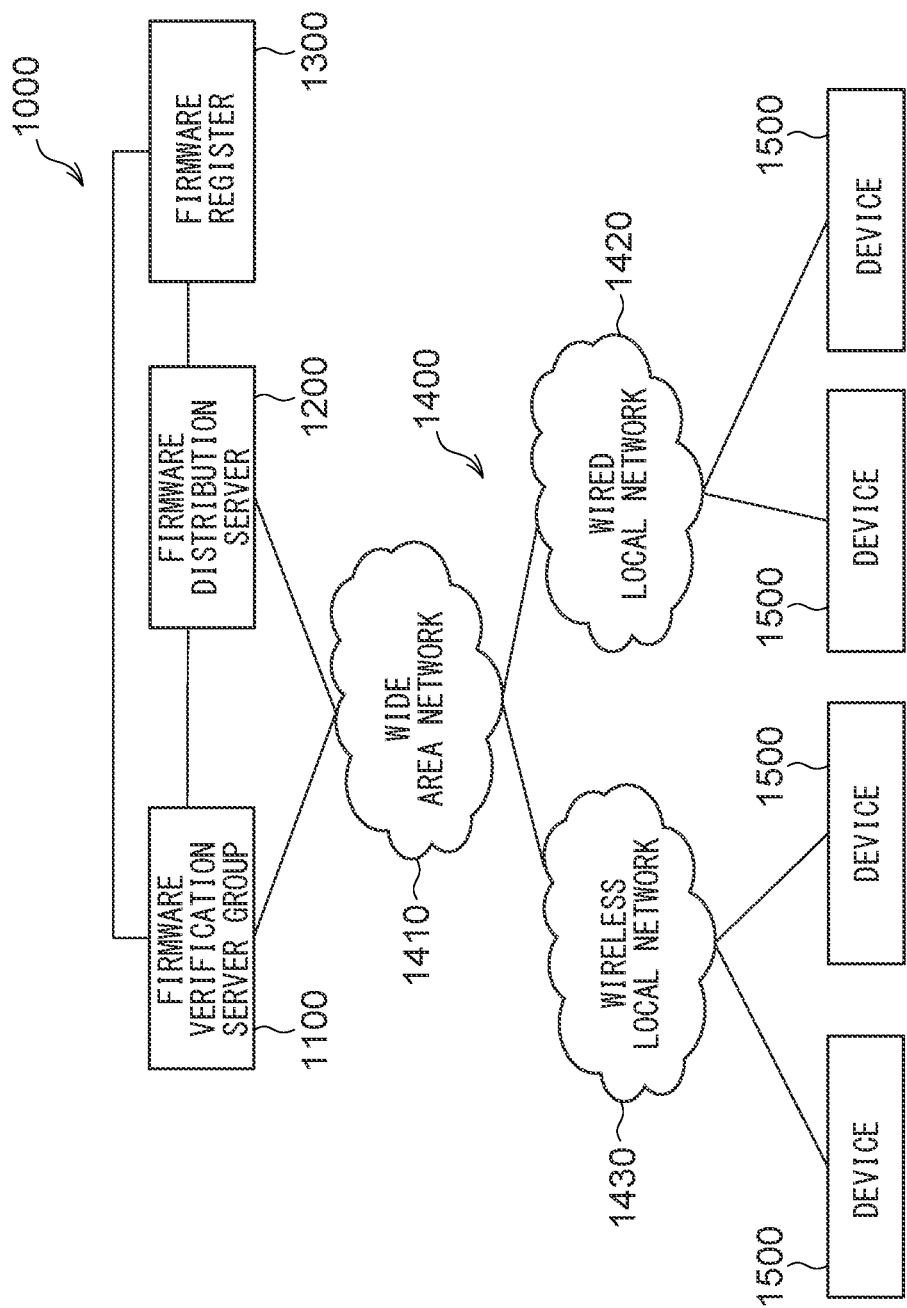
FIG. 1 is an overall configuration diagram of an information processing system according to the present embodiment.

FIG. 1 shows an overall configuration of an information processing system 1000 according to the present embodiment.

The information processing system 1000 includes a firmware verification server group 1100, a firmware distribution server 1200, and a firmware register 1300.

The information processing system 1000 is connected to a plurality of devices 1500 via a network 1400.

In the information processing system 1000 according to the present embodiment, devices 1500 installed at different locations update firmware using the information processing system 1000 that is a cloud system.

The network 1400 is made up of a plurality of networks. For example, in the present embodiment, the network 1400 is made up of a wide area network 1410, a wired local network 1420, and a wireless local network 1430.

The wide area network 1410 is connected to the firmware verification server group 1100 and the firmware distribution server 1200. The devices 1500 can communicate with the firmware verification server group 1100 and the firmware distribution server 1200 through the wide area network.

Each device 1500 is a device on which firmware that is software to be updated run. While the device 1500 is a PC or an embedded device in the present embodiment, alternatively, other devices may be adopted as long as firmware runs on the devices.

For example, the device 1500 is arranged in the field as done so in a sensor network operation and connected by the wireless local network 1430 via a wireless access point. For example, the device 1500 is installed in a factory or the like and connected by the wired local network 1420 that is the Ethernet or the like.

The device 1500 is connected to the wide area network 1410 that is the Internet or the like via the wired local network 1420 and the wireless local network 1430.

Figure 2:
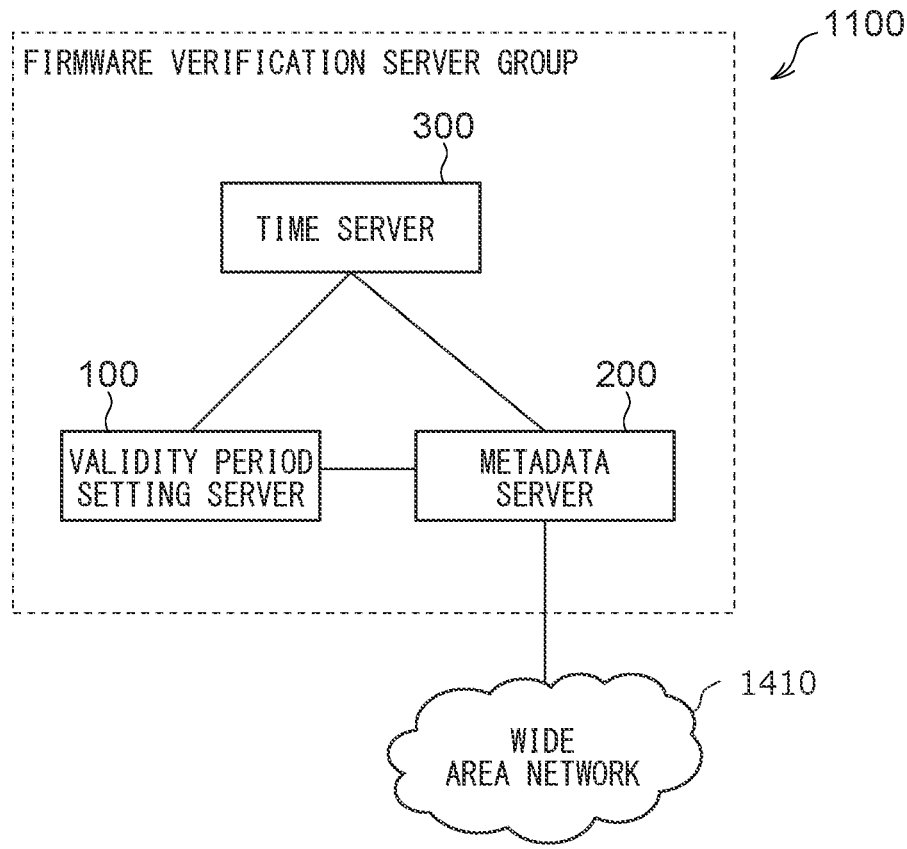
FIG. 2 is a diagram showing constituent elements of a firmware verification server group according to the present embodiment.
Figure 3:
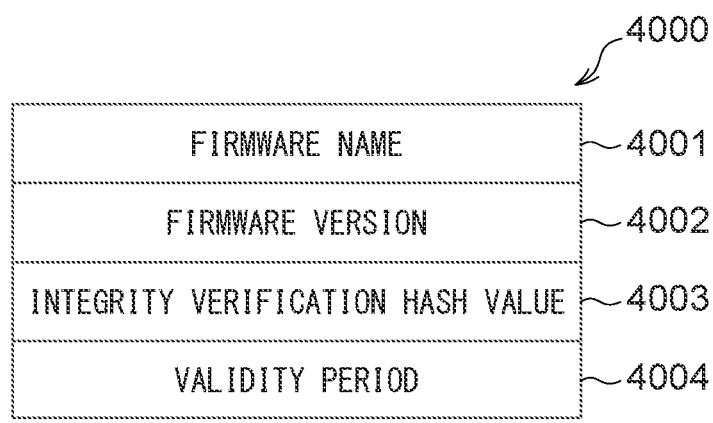
FIG. 3 is a diagram showing main constituent elements of distributed metadata.

FIG. 2 shows constituent elements of the firmware verification server group 1100 according to the present embodiment. FIG. 3 shows main constituent elements of distributed metadata 4000.

The firmware verification server group 1100 provides information for verifying validity of firmware.

In order to verify the validity of the firmware, the firmware verification server group 1100 generates, in response to a request from the device 1500, information referred to as metadata (first metadata) 4000 which enables the validity of firmware to be detected.

As shown in FIG. 3, the metadata 4000 includes a firmware name 4001, a firmware version 4002, an integrity verification hash value 4003, and a validity period 4004.

The firmware name 4001 and the firmware version 4002 are pieces of information for determining the firmware to be updated.

When combined, the firmware name 4001 and the firmware version 4002 function as an identifier for uniquely identifying the firmware.

By requesting an update, the device 1500 obtains the firmware from the firmware distribution server 1200 to be described later.

Based on the firmware name and the firmware version of the firmware of which an update has been requested, the device 1500 determines the metadata 4000 which the device 1500 requests the firmware verification server group 1100 to generate.

The integrity verification hash value 4003 is information for verifying integrity of the firmware. An electronic signature by the firmware register 1300 (to be described later) is set to the integrity verification hash value 4003.

The integrity verification hash value 4003, the firmware name 4001, and the firmware version 4002 are pieces of identification information for identifying the firmware.

The validity period 4004 is information indicating a validity period of the metadata 4000 and details will be provided later.

An electronic signature by a validity period setting server 100 (to be described later) is set to the validity period 4004 to enable any falsification made to the validity period 4004 to be readily detected.

Separation of firmware and the metadata 4000 for verification enables the information processing system 1000 according to the present embodiment to finely control the validity period 4004.

An update frequency of firmware is often determined by, for example, the number of vulnerabilities included in the firmware, a frequency of discovery of such vulnerabilities, and the like. Accordingly, it is difficult to predict a release timing of next-version firmware at a release timing of present firmware.

When firmware is to include its own validity period, an extremely long period must be set as the validity period of the firmware in order to prevent a situation where the validity period expires before next-version firmware is released.

For example, a longest validity period must be determined when setting an electronic signature to firmware and the firmware must be signed by setting the validity period.

Setting the validity period 4004 to a long period may problematically induce a downgrade due to old firmware still being valid despite new firmware being released.

By separately acquiring the metadata 4000, the information processing system 1000 can flexibly set a validity period when the firmware verification server group 1100 creates the metadata 4000.

In a conceivable case, the validity period 4004 is set to around several minutes to several days depending on an operation status of the firmware.

For example, when a network environment of the device 1500 is preferable and the metadata 4000 can be acquired on-demand, the validity period is set to several minutes.

When the device 1500 requests metadata of latest firmware, the metadata 4000 is transmitted on-demand and the device 1500 can complete verification and update to the latest firmware within the validity period 4004.

For example, in an environment where a network is not connected due to high security demands or a network is congested due to a security incident and the network is not established or unstable, the validity period 4004 is set to several days.

When the device 1500 requests metadata of latest firmware, a developer must obtain the metadata 4000 from the firmware verification server group 1100, transport the metadata 4000 to the site of the device 1500, and input the metadata 4000 to the device 1500 using a USB memory or the like.

Since it takes time for the device 1500 to complete the verification of the metadata 4000, a length of several days is necessary as the validity period 4004.

In such a case, since the validity period 4004 is several days at the longest, a probability of sustaining a downgrade attack using the metadata 4000 is low.

For example, since metadata 4000 having already been transmitted has a short reuse period as long as time information set to the device 1500 is correct and a probability of a replay attack being successful is low.

When the metadata 4000 of firmware other than the latest firmware is requested, the firmware verification server group 1100 can prevent circulation of old metadata by declining to transmit the metadata 4000.

The firmware verification server group 1100 includes the validity period setting server (first information processing device) 100, a metadata server (second information processing device) 200, and a time server 300.

While the servers that make up the firmware verification server group 1100 are physical servers being a plurality of information processing devices in the present embodiment, the servers need not be physical servers. For example, the servers may be virtual servers or container environments.

From the perspective of security, desirably, the servers that make up the firmware verification server group 1100 are not configured so that a plurality of processes run on a single OS. For example, desirably, a configuration in which memory isolation is not performed on a single server and the single server performs the roles of the validity period setting server 100, the metadata server 200, and the time server 300 is not adopted.

By performing memory isolation, even when attacked by a malicious third party, the servers that make up the firmware verification server group 1100 can prevent servers other than an attacked server from being affected.

In the present embodiment, the validity period setting server 100, the metadata server 200, and the time server 300 that make up the firmware verification server group 1100 are independently operated.

Figure 4:
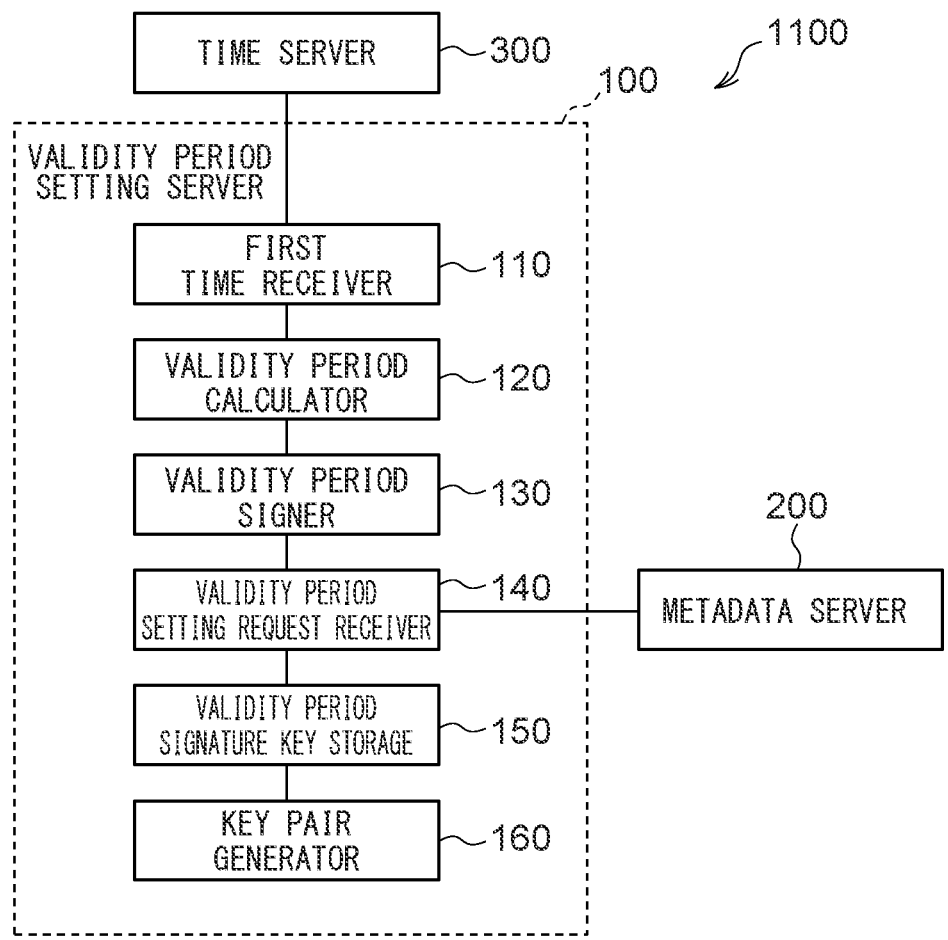
FIG. 4 is a diagram showing constituent elements of a validity period setting server according to the present embodiment.

FIG. 4 shows constituent elements of the validity period setting server 100 according to the present embodiment.

The validity period setting server 100 sets the validity period 4004 to the metadata 4000.

When the validity period setting server 100 is requested by the metadata server 200 to set a validity period to the metadata 4000, the validity period setting server 100 sets the validity period 4004 to the entire piece of metadata 4000 and sends back the metadata 4000.

The validity period 4004 is obtained by adding, to the present time, a validity time determined in advance by the entire information processing system 1000. An electronic signature by the validity period setting server 100 is set to the validity period 4004 to prevent falsification.

When the validity period setting server 100 is attacked by a malicious third party, there is a possibility that the validity period 4004 of the metadata 4000 to be transmitted to the device 1500 becomes freely falsified.

For example, the malicious third party attempts to downgrade the firmware of the device 1500 by extending the validity period 4004.

At this point, since the malicious third party is unable to falsify the integrity verification hash value 4003, all the malicious third party can do is to cause the device 1500 to mistakenly believe that the old-version firmware is still valid.

The validity period setting server 100 includes a first time receiver 110, a validity period calculator 120, a validity period signer 130, a validity period setment request receiver 140, a validity period signature key storage 150, and a key pair generator 160.

The first time receiver 110 communicates with the time server 300 as a part of a time manager that manages time and synchronizes absolute time. The first time receiver acquires time from time information of the time server 300.

The first time receiver 110 synchronizes with absolute time that indicates a time expression capable of uniquely identifying a given time regardless of device or location such as 8:30 and 23:24.

Even if the absolute time indicated by the time information acquired by the first time receiver 110 deviates from the absolute time recognized by the validity period setting server 100, the first time receiver 110 corrects the absolute time so as to conform to the received time information.

The validity period calculator 120 functions as a validity period determiner that calculates a validity period (a first validity period) by adding a validity time defined in advance in the system to the present absolute time. For example, when the validity time is 1 day and the present time is 10:10, the validity period is until 10:10 on the following day, and when the validity time is 10 minutes, the validity period is until 10:20 on the same day.

The validity period signer 130 electronically signs a concatenation of the calculated validity period 4004 and a metadata source to set an unfalsifiable validity period to the entire metadata source.

A metadata source refers to information to be a source of the metadata 4000 to be described later when generating the metadata 4000.

The validity period setting request receiver 140 receives a request to attach a validity period to a metadata source. The request received by the validity period setting request receiver 140 is transmitted to the validity period calculator 120.

The validity period signature key storage 150 stores keys (a private key and a public key) generated by the key pair generator 160.

Since the validity period signature key storage 150 and the key pair generator 160 are both inside the validity period setting server 100, there is no risk of leakage due to, for example, transfer from the outside or cracking of a key generation device.

Figure 5:
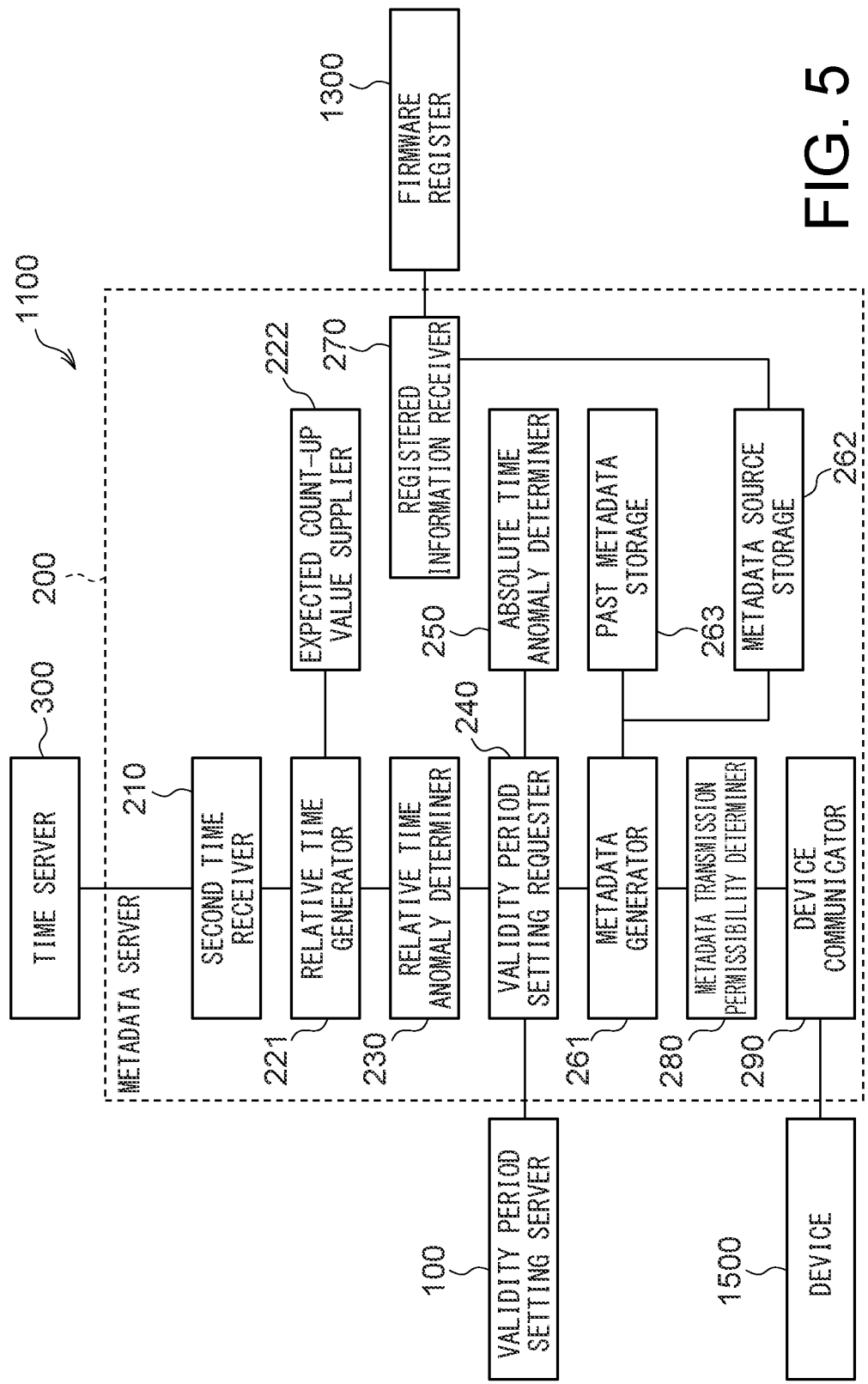
FIG. 5 is a diagram showing constituent elements of a metadata server according to the present embodiment.

FIG. 5 shows constituent elements of the metadata server 200 according to the present embodiment.

The metadata server 200 generates metadata in compliance with a request from a device.

The metadata server 200 is connected to the validity period setting server 100 and the time server 300. Since the metadata server 200 needs to transmit metadata, the metadata server 200 is connected to the wide area network 1410 and is capable of directly communicating with the device 1500.

The metadata server 200 determines metadata to be generated using, as a key, the firmware name 4001 and the firmware version 4002 received from the device 1500.

When creating the metadata 4000, the metadata server 200 only holds the firmware name 4001, the firmware version 4002, and the integrity verification hash value 4003.

By requesting the validity period setting server 100 to attach a validity period, the metadata server 200 can acquire the validity period 4004 not held by the metadata server 200 and generate the metadata 4000.

When the metadata server 200 is attacked by a malicious third party, there is a possibility that the metadata 4000 to be transmitted to the device 1500 becomes freely falsified.

For example, since an electronic signature by the firmware register 1300 is set to the integrity verification hash value of the metadata 4000, the device 1500 cannot be made to recognize an arbitrary hash value. Accordingly, counterfeit firmware can be prevented from being introduced.

For example, an electronic signature by the validity period setting server 100 is set to the validity period 4004 of the metadata 4000. Accordingly, it is impossible to falsify the validity period 4004 or, even if metadata 4000 for old firmware is transmitted, the validity period of the metadata 4000 can be handled by the device 1500 as being expired. In other words, the device 1500 cannot be forced to erroneously recognize the metadata 4000 as valid metadata 4000 and a downgrade due to a replay attack can also be prevented.

The metadata server 200 holds no classified information such as a private key. Information of the metadata 4000 is electronically signed by the firmware register 1300 and the validity period setting server 100.

Even if internal information of the metadata server 200 is leaked due to an attack by a malicious third party, since the internal information is limited to the metadata 4000 that does not include classified information, it is unlikely that the internal information will be used in an attack by the malicious third party even when leaked.

The metadata server 200 includes a second time receiver 210, a relative time generator 221, an expected count-up value supplier 222, a relative time anomaly determiner 230, a validity period setting requester 240, an absolute time anomaly determiner 250, a metadata generator 261, a past metadata storage 263, a registered information receiver 270, a metadata transmission permissibility determiner 280, and a device communicator 290.

The second time receiver 210 communicates with the time server 300 and synchronizes absolute time.

The second time receiver 210 synchronizes with absolute time that indicates a time expression capable of uniquely identifying a given time regardless of device or location such as 8:30 and 23:24.

Even if the absolute time indicated by the time information acquired by the second time receiver 210 deviates from the absolute time recognized by the metadata server 200, the second time receiver 210 corrects the absolute time so as to conform to the received time information.

While the second time receiver 210 comprehends time by synchronization at a timing where time is important such as when creating the metadata 4000, alternatively, the second time receiver 210 may comprehend time during regular time confirmation by a calculation that is based on a comprehended absolute time and a relative time to be described later.

The relative time generator 221 generates a relative time by generating a counter value (a first counter value) that continuously increases from the moment the metadata server 200 is activated. The relative time generator 221 functions as a counter that counts up a value per unit time and an acquirer that acquires the counter value.

While a time stamp register inside a CPU is used in the present embodiment, other hardware may be used instead.

The counter value that increases in the relative time generator 221 is a value that is added up by hardware means and is not falsified by an attack on the counter value by software means such as malware.

Relative time is a time which is individually held by each device 1500 and which is not dependent on outside environment. In the present embodiment, the relative time refers to a period elapsed from activation of the device 1500 when the time is activated is assumed to be 0.

The relative time differs from one device 1500 to the next at any absolute time. The relative time need not be expressed by seconds, minutes, and hours and may be expressed by the number of clock cycles generated by a clock oscillator inside the device 1500.

For example, time stamp registers are being widely mounted on recent CPUs and have a function of increasing a value thereof in accordance with a clock.

Since a rate of increase of the value of the time stamp depends on CPU frequency, devices 1500 with different CPU frequencies will have different relative times at a same absolute time even when activated at the same time.

Even when CPUs are a same product with a same model number, there is some discrepancy between frequencies which are physical phenomena. Based on the discrepancy between frequencies, a discrepancy is also created in the time stamp registers mounted in the CPUs. Accordingly, it is hardly likely that relative times of devices 1500 will be exactly the same even when mounted with the same CPU and, in a same device, the relative time enables a relative elapsed time from activation to be determined.

Since a relative time requires a constant rate of increase based on a constant frequency, it is difficult to use a CPU of which an operating frequency dynamically varies depending on processing load and which is unable to provide a constant rate of increase of a value of a time stamp register.

In such a case, using a register that returns a device-specific count value independent of a frequency instead of using a time stamp register, a relative time can be made a value that monotonically increases in a single device.

The expected count-up value supplier 222 calculates, for example, how much a relative time is to be counted up per validity period.

For example, when the validity period is 1 day, the expected count-up value supplier 222 returns a value that is counted up in 1 day as an expected count-up value (EC) since the present number of valid days (D) is 1 day.

The relative time anomaly determiner 230 verifies a relative time at the time of generation of the metadata 4000. The relative time anomaly determiner 230 calculates a difference between a validity period of the last metadata 4000 to be transmitted normally and a validity period of internally-generated metadata 4000 using a processing method to be described later and determines whether or not there is no anomaly in the relative time upon generation of the metadata 4000.

The validity period setting requester 240 requests the validity period setting server 100 to attach a validity period necessary for generating the metadata 4000.

The absolute time anomaly determiner 250 verifies an absolute time.

The metadata generator 261 generates the metadata 4000 by combining a validity period received via the validity period setting requester 240 and information in the metadata source storage 262.

The information on firmware having been input by the firmware register 1300 is stored in a metadata source storage 262 via the registered information receiver 270.

Figure 6:
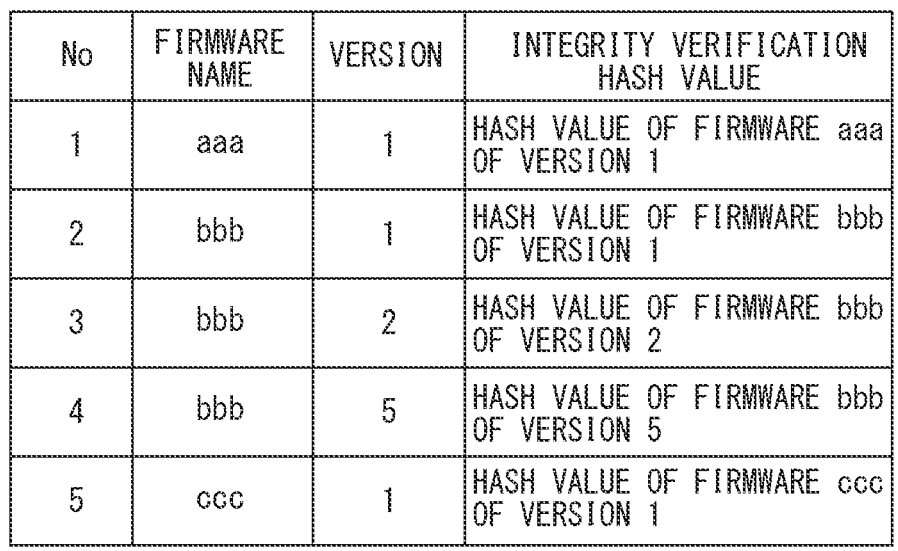
FIG. 6 is a diagram showing information stored in a metadata source storage.

FIG. 6 shows information 6000 stored in the metadata source storage 262.

The metadata source storage 262 is storage for permanently storing information necessary for creating the metadata 4000.

For example, the metadata source storage 262 stores the firmware name 4001, the firmware version 4002, and the integrity verification hash value 4003.

For example, the metadata source storage 262 stores information other than a validity period that is set by the validity period setting server 100.

An entry is added to the metadata source storage 262 every time firmware is registered by the firmware register 1300.

For example, even when the firmware name 4001 is the same, the metadata source storage 262 stores a different entry when the firmware version 4002 differs.

Even when the firmware name 4001 and the firmware version 4002 of firmware are completely the same, the firmware can also be registered in the metadata source storage 262 as new firmware by formally changing the firmware version 4002.

In such a case, a plurality of entries with the same integrity verification hash value 4003 are to be registered.

For example, when a bug is discovered in new distributed firmware and a rollback to old firmware must be carried out immediately, since the firmware version 4002 of the old firmware is order than the firmware version 4002 of the new firmware, the update cannot be performed.

In such a case, in order to update to the old firmware, the firmware version 4002 of the old firmware is changed and registered as a new version. Accordingly, even though the firmware is substantially firmware of an old version, the firmware can be updated by registering the firmware as a new version.

Figure 7:
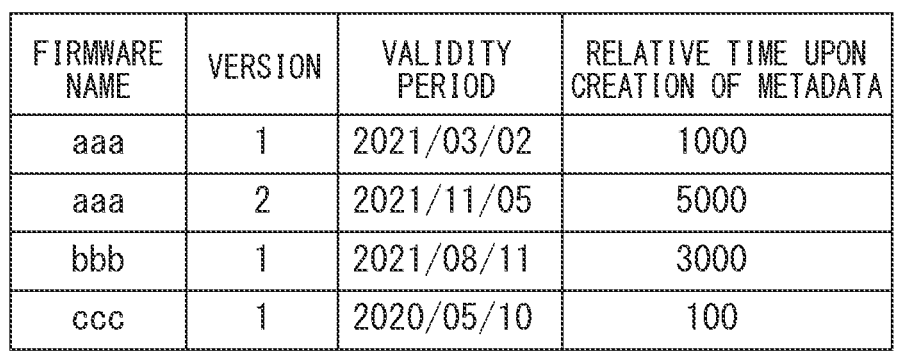
FIG. 7 is a diagram showing information stored in a past metadata storage.

FIG. 7 shows information stored in the past metadata storage 263.

The past metadata storage 263 stores information 5000 of last piece of metadata 4000 transmitted to the device 1500.

For example, the information 5000 is an entry which associates metadata (second metadata) having been normally transmitted to the device 1500 with the firmware name 4001, the firmware version 4002, a validity period (a second validity period), and a relative time (second counter value) when generating the metadata.

The past metadata storage 263 functions as a storage that stores the entry.

For example, an entry at a relative time "1000" when the metadata 4000 had been generated using the firmware name 4001 "aaa", the firmware version 4002 "1", and the validity period 4004 "2021/03/02" is stored and memorized.

For example, an entry at a relative time "3000" when the metadata 4000 had been generated using the firmware name 4001 "bbb", the firmware version 4002 "1", and the validity period 4004 "2021/08/11" is stored and memorized.

The past metadata storage 263 only holds an immediately-preceding entry for each combination of the firmware name 4001 and the firmware version 4002, and when a newer entry (first entry) of a combination of the same firmware name 4001 and the same firmware version 4002 is transmitted to the device 1500, the information is also overwritten.

The metadata transmission permissibility determiner 280 determines a permissibility of transmission of the generated metadata 4000 according to results determined by the absolute time anomaly determiner 250 and the relative time anomaly determiner 230.

When metadata 4000 with a long validity period 4004 is transmitted, there is a possibility that a malicious third party may launch a downgrade attack.

In order to prevent the attack, the metadata server 200 tries to avoid transmitting metadata 4000 with an abnormal validity period as much as possible.

The metadata server 200 checks whether or not times of the time server 300 and the validity period setting server 100 have been falsified by checking the absolute time and the relative time.

The device communicator 290 performs wireless communication with the device 1500 to transmit the metadata 4000 of which transmission has been determined.

The device communicator 290 includes a circuit that processes a communication protocol, an AD/DA converter, a frequency converter, a band filter, an amplifier, an antenna and the like. It should be noted that a form in which the device communicator 290 is connected to the device 1500 in a wired manner is also not precluded.

The time server 300 distributes accurate time. While the time server 300 uses the NTP (Network Time Protocol) in the present embodiment, other protocols may be used as long as accurate time can be distributed.

In a cloud system, for example, time synchronization is essential for purposes such as log management. Accordingly, all of the servers that make up the cloud system are to be synchronized with the time distributed by the time server 300.

The time server 300 is connected to the validity period setting server 100 and the metadata server 200 by loose coupling. Since the time server 300 uses a standard protocol such as NTP, the time server 300 may be replaced with a public NTP serve. In other words, the time server 300 does not need to be privately operated by a same operating organization as an operating organization of the firmware verification server group 1100.

For example, when the reliability of a public NTP server is questionable or when the information processing system 1000 including the time server 300 must be securely operated, the time server 300 is desirably privately operated.

There is a possibility that an attack by a malicious third party may cause the time server 300 to synchronize the firmware verification server group 1100 with a fake time and generate metadata with a long validity period, for example.

For example, when the information processing system 1000 is operated to always generate metadata 4000 of which a validity period is one day ahead, there is a possibility that a present time of the firmware verification server group 1100 becomes synchronized with a time a year from now due to an attack by a malicious third party.

In such a case, although an apparent validity period 4004 of the metadata 4000 generated by the firmware verification server group 1100 is one day ahead, the metadata 4000 actually has a validity period of one year.

In such a case, since the malicious third party is unable to falsify the integrity verification hash value 4003, all the malicious third party can do is to cause the device 1500 to mistakenly believe that the old-version firmware is still valid. The metadata server 200 can detect time falsification by processing to be described later.

The firmware distribution server 1200 distributes a main body of firmware to the device 1500.

The device 1500 obtains unique firmware from the firmware distribution server 1200 using a firmware name and a version as a key.

The firmware distribution server 1200 stores the firmware in a state where each file is listed in a format "file name+version" in a directory as seen in a general file server.

For example, while the device 1500 can acquire the list of firmware inside the directory of the firmware distribution server 1200 and download a main body when necessary, if the device 1500 is capable of downloading firmware, other methods may be used instead.

The firmware register 1300 initially registers information necessary for a firmware update to the firmware verification server group 1100 and the firmware distribution server 1200.

The firmware register 1300 is connected to the firmware verification server group 1100 and the firmware distribution server 1200. As long as the firmware register 1300 is capable of communicating with the server group or the server, the firmware register 1300 need not be otherwise connected.

Figure 8:
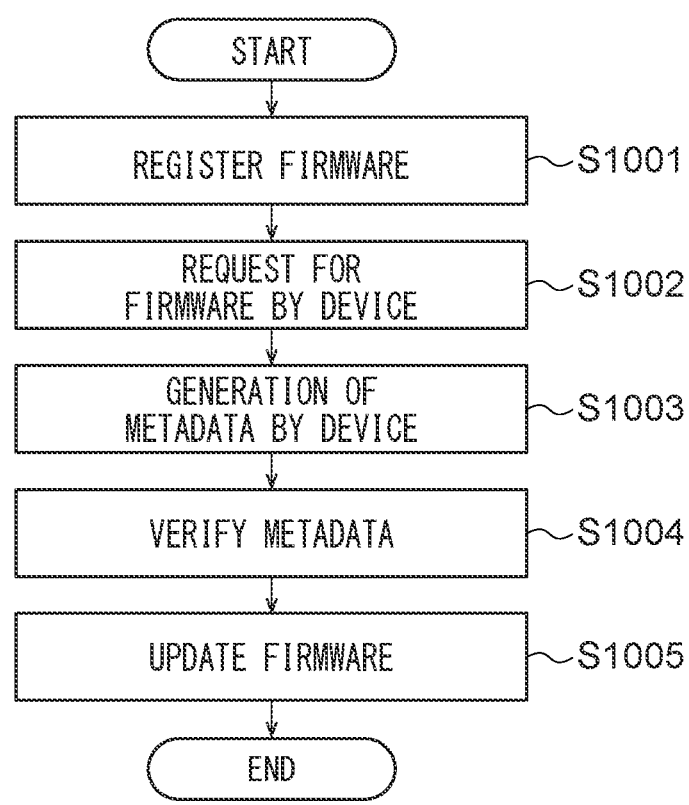
FIG. 8 is a flow chart showing an example of update processing of the information processing system according to the present embodiment.

FIG. 8 shows an example of update processing of the information processing system 1000 according to the present embodiment.

For example, when a vulnerability is discovered in the firmware of the device 1500 or a new function must be added to the firmware, a firmware developer creates new firmware when necessary.

Distribution of the created firmware is determined after a test is completed.

Update processing of the information processing system 1000 according to the present embodiment is premised on completion of a test of new firmware developed by the firmware developer and a determination to distribute the firmware as described above.

The firmware developer inputs new firmware to the firmware register 1300. The firmware register 1300 transmits the input firmware to the firmware verification server group 1100 and the firmware distribution server 1200 and registers information (S1001).

Due to the registration, the firmware is stored in the firmware distribution server.

The firmware distribution server 1200 distributes the firmware in compliance with a request from the device 1500 (S1002).

The firmware verification server group 1100 generates metadata 4000 in compliance with a request from the device 1500 (S1003).

The device 1500 verifies the metadata 4000 transmitted from the firmware verification server group 1100 (S1004). When the device 1500 is able to verify the validity of the firmware by the metadata 4000, the device 1500 updates the firmware (S1005).

Figure 9:
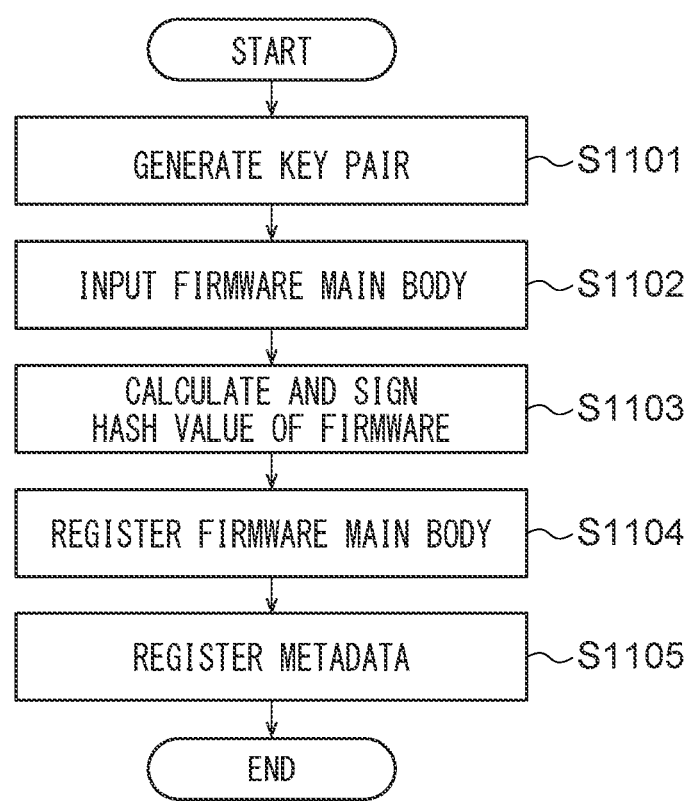
FIG. 9 is a flow chart showing an example of registration processing of firmware described in step S1001.

FIG. 9 shows an example of registration processing of firmware described in step S1001.

First, the firmware register 1300 and the validity period setting server 100 generate a key pair (S1101).

The firmware register 1300 generates a key pair (a private key and a public key) of a public key encryption scheme. The generated key pair is used to electronically sign and verify an integrity verification hash value of the metadata 4000.

The public key creates a state where validity of the public key itself can be verified by using a mechanism of a PKI or by embedding the public key in a device.

A key pair of the public key encryption scheme is also generated by the validity period setting server 100. The generated key pair is used to electronically sign and verify a validity period of the metadata 4000.

The public key creates a state where validity can be checked from the device 1500.

The firmware developer inputs the new firmware to the firmware register 1300 together with the firmware name 4001 and the firmware version 4002 (S1102).

The firmware name 4001 and the firmware version 4002 need not be manually input. For example, when the firmware name 4001 and the firmware version 4002 are embedded in the firmware, the firmware register 1300 may automatically read the firmware name 4001 and the firmware version 4002 or a mechanism may be adopted where the firmware name 4001 and the firmware version 4002 are automatically recognized from the firmware name 4001 at the time of registration.

The firmware register 1300 calculates the integrity verification hash value 4003 of the firmware and electronically signs the integrity verification hash value 4003 with a private key (S1103).

The firmware register 1300 registers the firmware to the firmware distribution server 1200 (S1104).

The firmware register 1300 sets information on the firmware name 4001 and the firmware version 4002 upon registration.

Due to the attachment, the device 1500 can obtain a unique firmware main body from the firmware distribution server using the firmware name 4001 and the firmware version 4002 as a key.

The firmware register 1300 transmits the firmware name 4001, the firmware version 4002, and the electronically-signed integrity verification hash value 4003 to the metadata server 200 (S1105).

The information transmitted by the firmware register 1300 is stored in the metadata source storage 262 via the registered information receiver 270.

Figure 10:
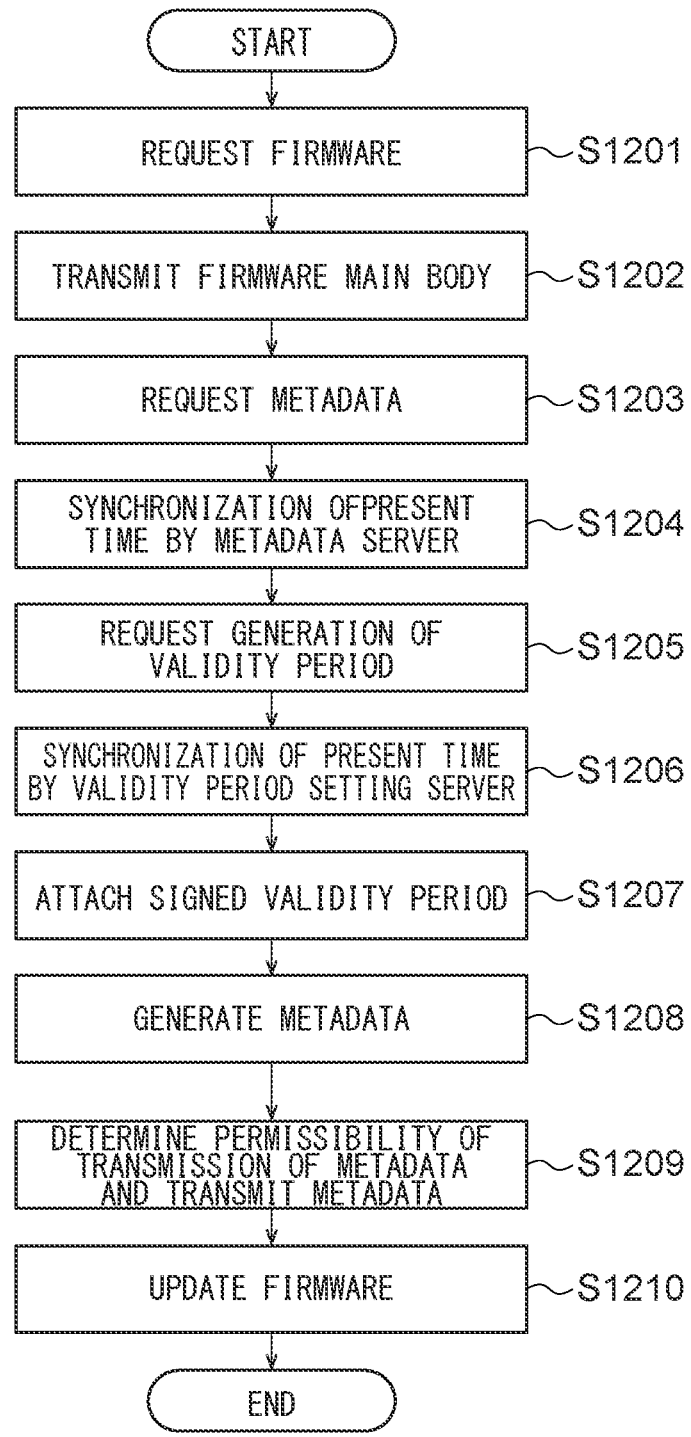
FIG. 10 is a flow chart showing an example of processing during a firmware update according to the present embodiment.

FIG. 10 shows an example of processing during a firmware update according to the present embodiment.

First, the device 1500 requests firmware (S1201).

The device 1500 regularly recognizes the need to update firmware by an arbitrary method. An example of the arbitrary method is that the device 1500 itself accesses the firmware distribution server 1200 and checks whether latest firmware has been released. For example, the device 1500 recognizes the need to download the latest firmware upon receiving a push notification from another server.

When the device 1500 recognizes the need to update firmware due to the recognition, the device 1500 issues a request for firmware to the firmware distribution server 1200.

The firmware distribution server 1200 uniquely recognizes firmware to be updated by checking the firmware name 4001 and the firmware version 4002 and transmits the firmware to the device 1500 (S1202).

The device 1500 requests the metadata 4000 to the metadata server 200 in order to check the validity of the firmware (S1203).

In order to determine the metadata 4000 to be requested, the device 1500 transmits the request so that corresponding firmware can be uniquely determined using the firmware name 4001 and the firmware version 4002 as a key.

The metadata server 200 receives the request from the device 1500 and starts generating the metadata 4000.

The second time receiver 210 communicates with the time server 300 and synchronizes absolute time (S1204).

The validity period setting requester 240 requests attachment of the validity period 4004 to the metadata 4000 (S1205).

Using the firmware name 4001 and the firmware version 4002 as a key, the validity period setting requester 240 searches for an entry with a matching combination from the metadata source storage 262.

The validity period setting requester 240 extracts a matching entry as information to be a source of the metadata 4000 or, in other words, a metadata source. In addition, the validity period setting requester 240 requests the validity period setting server 100 to attach the validity period to the entire metadata source.

The validity period setting server 100 synchronizes absolute time with the time server 300 in order to accommodate the request for setting the validity period as received by the validity period setting request receiver 140 (S1206).

By having the validity period calculator 120 calculate a validity period and having the validity period signer 130 electronically sign the validity period, the validity period setting server 100 transmits the validity period to the metadata server (S1207).

The metadata server 200 causes the metadata generator 261 to concatenate the acquired validity period 4004 and a metadata source and to generate the metadata 4000 (S1208).

The metadata transmission permissibility determiner 280 verifies the metadata 4000 and, when the metadata 4000 is normal, transmits the metadata 4000 to the device 1500 (S1209).

When the metadata 4000 is abnormal, the metadata transmission permissibility determiner 280 suspends transmission of the metadata 4000 to the device 1500.

The device 1500 updates firmware based on a transmitted result (S1210).

Figure 11:
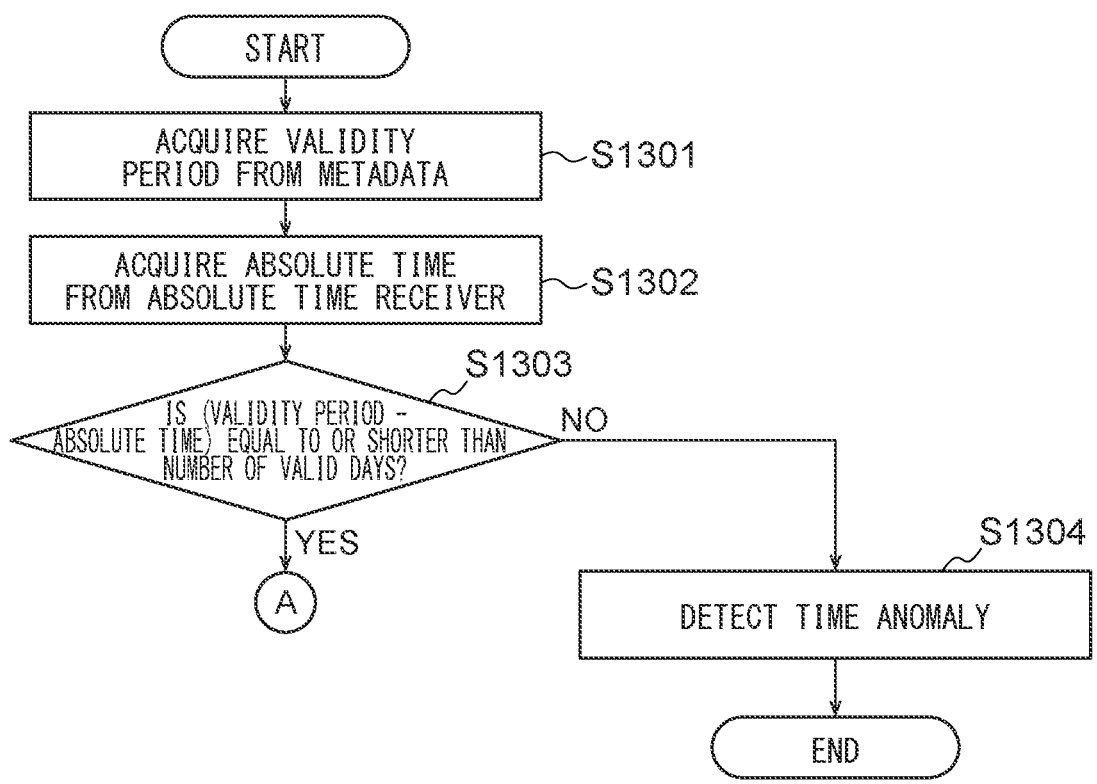
FIG. 11 is a flow chart showing an example of determination processing of absolute time falsification.

FIG. 11 shows an example of determination processing of absolute time falsification.

When launching a downgrade attack to the device 1500, a malicious third party is likely to penetrate into the validity period setting server 100 or the time server 300.

For example, in a case where the validity period setting server 100 is penetrated, a private key for an electronic signature of the validity period setting server 100 is likely to be stolen by the third party.

The malicious third party can use the stolen private key to attach a correct electronic signature and transmit an abnormally long validity period 4004 to the metadata server 200.

Even when the malicious third party is unable to steal the private key such as when the key itself is securely protected by a hardware security module or the like and cannot be stolen, the malicious third party resets the absolute time recognized by the validity period setting server 100 to the future. Accordingly, the third party can use the stolen private key to attach a correct electronic signature and set an abnormally long validity period 4004.

For example, when the time server 300 is compromised, the absolute times of the validity period setting server 100 and the metadata server 200 are simultaneously falsified and become future absolute times.

Even when absolute times are simultaneously falsified, as the firmware verification server group 1100 as a whole, the validity period setting server 100 and the metadata server 200 operate normally.

Accordingly, the metadata 4000 with a long validity period 4004 is transmitted to the network 1400.

In order to prevent such an attack, the metadata server 200 performs an anomaly determination by combining an absolute time and a relative time.

In the following description, it is assumed that 1 day is set to the number of valid days (D) of the metadata 4000 in the information processing system 1000.

In other words, as the validity period 4004, D that is the number of valid days or 1 day is added to the present day. While a description will be given with the smallest unit being the unit of days and rounding down smaller portions such as minutes and hours, in the present embodiment, the information processing system 1000 is not limited to the number of valid days in unit of days.

First, the metadata server 200 comprehends the validity period of the metadata 4000 (S1301).

The metadata server 200 causes the second time receiver 210 to synchronize an absolute time and acquires the absolute time (S1302).

The absolute time anomaly determiner 250 compares the present absolute time with the validity period 4004 and verifies that the present absolute time is equal to or shorter than the number of valid days (D) (S1303).

When the present absolute time is equal to or shorter than the number of valid days (D), a transition is made to processing of A that is falsification determination processing of a relative time. When the present absolute time is longer than the number of valid days (D), a transition is made to S1304.

The absolute time anomaly determiner 250 determines that the absolute time is abnormal and detects a time anomaly (S1304).

When a time anomaly is detected, the transmission processing of the metadata 4000 is suspended.

In the present processing, when the absolute time of the validity period setting server 100 deviates to the future, it is expected that a difference in absolute times from the metadata server 200 that stores a normal absolute time is to become longer than the number of valid days (D). Accordingly, a time anomaly can be detected and measures can be taken against falsification of time of the validity period setting server 100.

Figure 12:
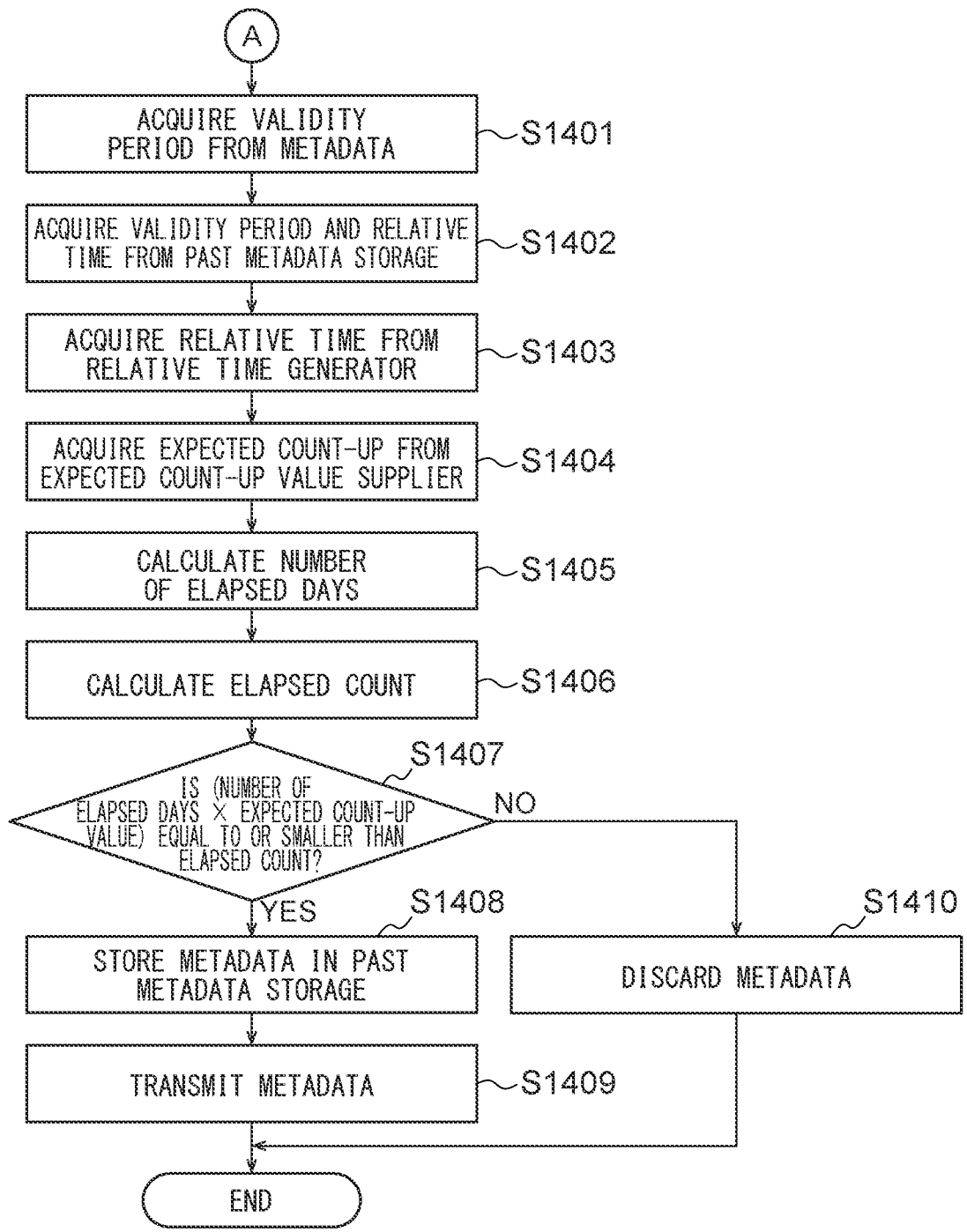
FIG. 12 is a flow chart showing an example of determination processing of relative time falsification in a metadata server.

FIG. 12 shows an example of determination processing of relative time falsification in the metadata server 200.

The present determination processing is premised on having already performed the determination processing of absolute time falsification and that there is no falsification of absolute time.

The metadata server 200 acquires a validity period (Expired Day now: ED_now) from the metadata 4000 (S1401).

The metadata server 200 acquires a validity period (Expired Day old: ED_old) and a relative time (Time Stamp Clock Old: TSC_old) from the past metadata storage 263 (S1402).

In the present description, since the number of valid days (D) is set to 1 day and the smallest unit is rounded to 1 day, the validity period of the past metadata storage 263 is also in units of days.

When the number of valid days (D) is to be finely controlled in units of valid hours or valid minutes, the number of valid days (D) is to be stored in the same granularity in the validity period of the past metadata storage 263.

When receiving a request for the metadata 4000 from the device 1500, the metadata server 200 receives the firmware name 4001 and the firmware version 4002. Accordingly, using the information as a key, appropriate contents can be acquired from the past metadata storage 263.

The metadata server 200 acquires a relative time (Time Stamp Clock Now: TSC_now) through the relative time generator 221 (S1403).

The metadata server 200 acquires an expected count-up value (Expect Count: EC) from the expected count-up value supplier 222 (S1404).

The relative time anomaly determiner 230 calculates the number of elapsed days (N) (S1405).

The relative time anomaly determiner 230 can calculate the number of elapsed days (N) by calculating ED_now−ED_old.

The number of elapsed days (N) is a difference between a validity period of the last metadata 4000 to be transmitted normally and a validity period of internally-generated metadata 4000. While the number of elapsed days is used in the present embodiment since the validity time is 1 day, when the validity time is other than 1 day, an elapsed time in accordance with the validity time may be used.

The relative time anomaly determiner 230 calculates an elapsed count (C) (S1406).

The relative time anomaly determiner 230 can calculate the elapsed count (C) by calculating TSC_now−TSC_old.

The elapsed count (C) is a difference between a relative time (ED_old) at the time of creation of the last metadata to be transmitted normally and the present relative time. In other words, the elapsed count (C) is a value counted up by the relative time generator 221 during the number of elapsed days (N).

The metadata server 200 determines falsification of the time server 300 (S1407). Accordingly, whether or not the time server 300 has been falsified and is distributing a future time can be determined.

The metadata server 200 determines whether or not a value (a third counter value) calculated as the number of elapsed days (N)×1 day's worth of expected count-up value (EC) is equal to or smaller than an elapsed count or, in other words, equal to or smaller than a threshold.

When the value is equal to or smaller than the elapsed count, it is determined that a future time is not being distributed and a transition is made to S1408, but when the value is larger than the elapsed count, it is determined that a future time is being distributed and a transition is made to S1410.

Next, the metadata server 200 stores the validity period 4004 and the relative time upon generation in the past metadata storage 263 (S1408).

When the time between generation of the metadata 4000 and determination of permissibility of transmission is extremely short, the metadata server 200 may store a relative time upon transmission of the metadata 4000 as an approximation of a metadata generation time.

When the time between the generation of the metadata 4000 and the determination of permissibility of transmission is expected to become extended, the metadata generator 261 may temporarily embed a generation time into the metadata 4000 to enable the time to be referred to during storage in the past metadata storage 263.

Next, the metadata server 200 transmits the metadata 4000 to the device 1500 (S1409).

When the metadata server 200 determines that a future time is being distributed, the metadata server 200 discards the metadata 4000 as abnormal data and suspends the transmission processing to the device 1500 (S1410).

The processing uses a characteristic that, even if the time server 300 distributes a fake absolute time, relative times of the servers that make up the firmware verification server group 1100 monotonically increase, independently of the absolute time.

For example, when the time server 300 distributes a future absolute time, since the value of the number of elapsed days (N) increases, a determination can be made according to the value obtained in step S1407. Accordingly, measures can be taken against falsification of time by the time server 300.

Figure 13:
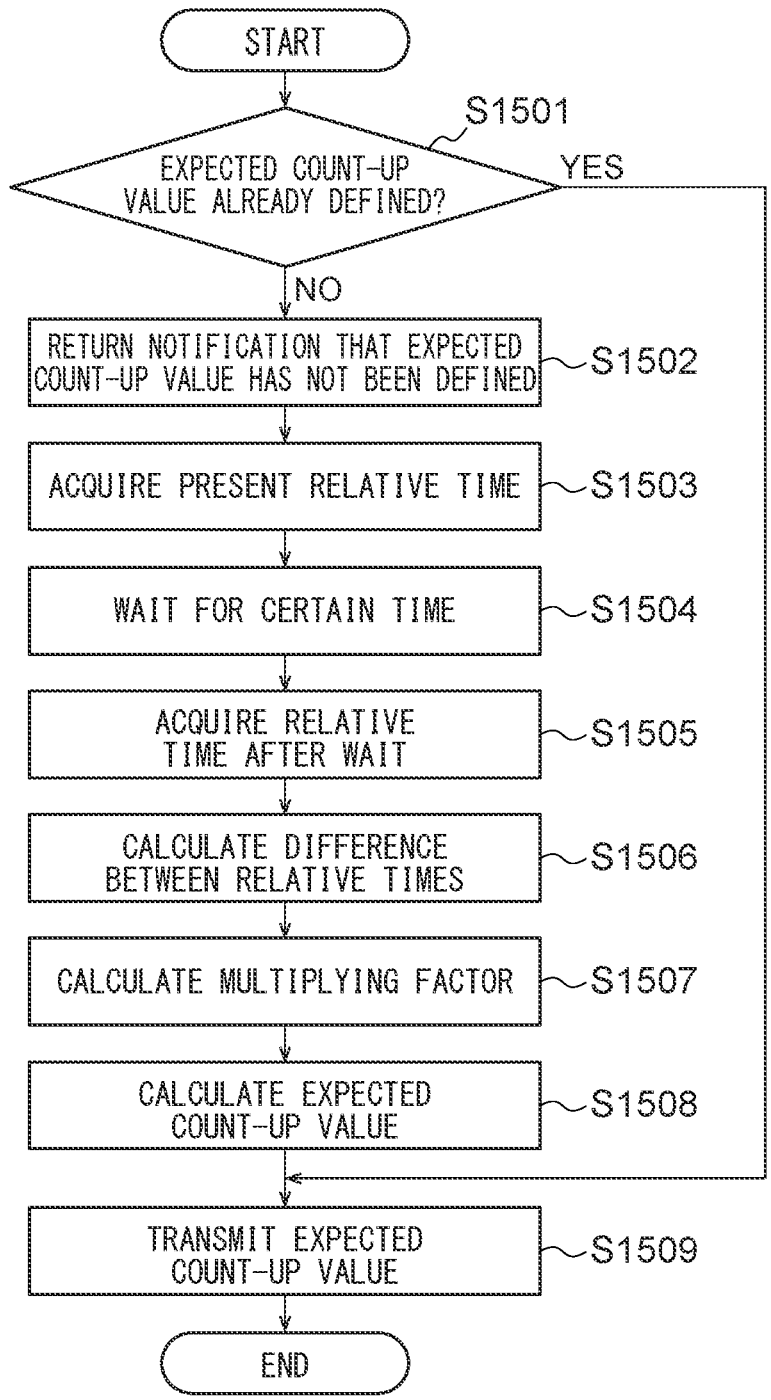
FIG. 13 is a flow chart showing a processing flow of an expected count-up value supplier.

FIG. 13 shows a processing flow of the expected count-up value supplier 222.

In the following description, since the information processing system 1000 sets 1 day as the number of valid days (D) of the metadata 4000, the processing will be described as processing of obtaining a value by which the relative time is counted up in a day.

The expected count-up value supplier 222 determines whether or not the expected count-up value has already been defined (S1501).

When the expected count-up value has been defined, a transition is made to S1509, but when the expected count-up value has not been defined, a transition is made to S1502.

Next, the expected count-up value supplier 222 responds that the expected count-up value has not been defined (S1502).

For example, when the information processing system 1000 is operating at full-scale, since the likelihood of the response is low, alert processing by a manager or the like is desirably performed.

The expected count-up value supplier 222 acquires a present relative time (T1) from the relative time generator 221 (S1503).

Next, the expected count-up value supplier 222 allows the relative time to be counted up by waiting for a certain period of time (TMP) (S1504).

The certain period of time (TMP) for waiting may be any kind of time as long as the time is sufficiently shorter than the number of valid days (D) and waiting is possible as an operation. For example, when the number of valid days (D) is 1 day, the certain period of time (TMP) may be around 1 minute.

The expected count-up value supplier 222 acquires a present relative time (T2) once again (S1505).

The expected count-up value supplier 222 uses the relative time (T2) and the relative time (T1) to calculate a difference (T) between relative times that is a value of T2−T1 (S1506).

The expected count-up value supplier 222 calculates a multiplying factor (n) (S1507).

The multiplying factor (n) is a ratio between an elapsed period and a unit time of counting up by the relative time generator 221.

The expected count-up value supplier 222 calculates the multiplying factor (n) by calculating the number of valid days (D)÷TMP.

For example, when the certain period of time (TMP) is 1 minute and the number of valid days is 1 day, since the number of valid days (D) equates to 1440 minutes (24 hours×60 minutes), the multiplying factor (n) is 1440.

Next, the expected count-up value supplier 222 calculates the expected count-up value (S1508).

The expected count-up value supplier 222 counts up only a difference (T) in relative times during the certain period of time (TMP).

For example, supposing that the difference (T) in relative times is 1000 clock cycles, from multiplying factor (n)× difference (T) in relative times, the relative time advances by 1440×1000 clock cycles in 1 day.

The expected count-up value supplier 222 stores multiplying factor (n)×difference (T) in relative times in itself as a defined expected count-up value.

The expected count-up value supplier 222 transmits the expected count-up value as a defined value (S1509).

Figure 14:
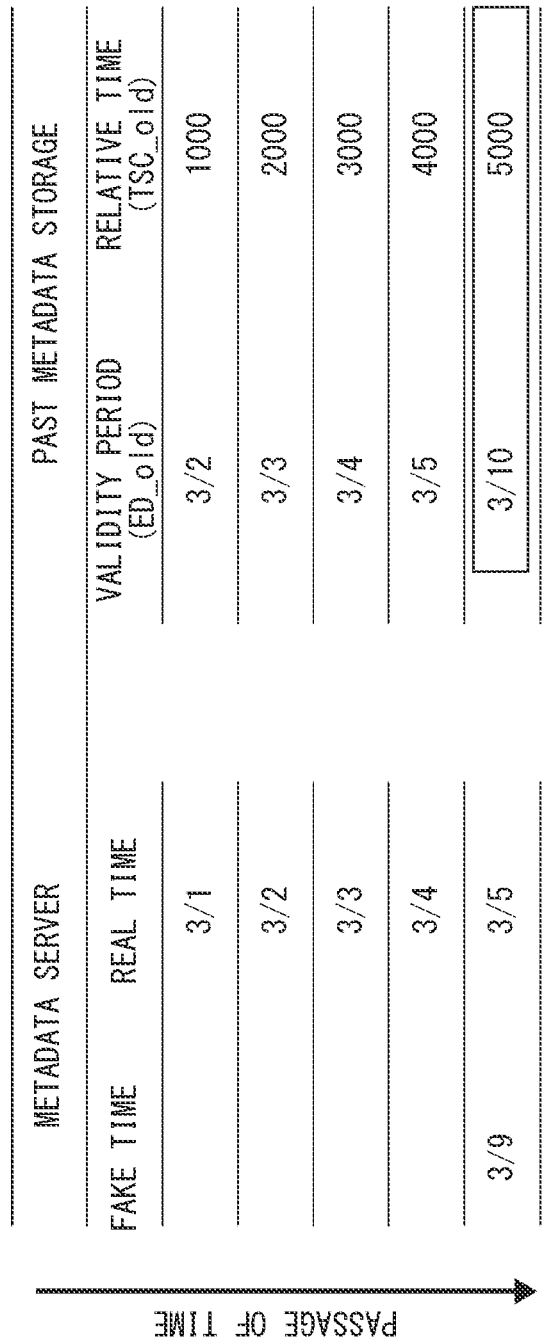
FIG. 14 is a diagram showing a contradictory situation when distribution of a future absolute time is triggered by an attack on a time server.

FIG. 14 shows a contradictory situation when distribution of a future absolute time is triggered by an attack on the time server 300.

Absolute time is based on time distribution by the time server. For example, when the time server 300 is attacked, future time is distributed.

For example, as shown in FIG. 14, the metadata server 200 that synchronizes with the time server 300 recognizes that the absolute time is 3/9 which is a synchronized fake time despite the real time being 3/5.

For example, the past metadata storage 263 stores information when the metadata server 200 creates the metadata 4000.

The information focuses on the metadata 4000 with respect to firmware including the firmware name 4001 and the firmware version 4002 and values are overwritten with the passage of time. At this point, it is assumed that the expected count-up value (EC) is 1000.

For example, in FIG. 14, when the metadata server 200 generates, on 3/3, metadata of which the validity period 4004 is 3/4, the relative time at that point is 3000.

The metadata 4000 can recognize that the number of elapsed days (N) is 1 day by referring to immediately-preceding ED_old. In addition, since referring to immediately-preceding TSC_old shows that the elapsed count (C) is 1000, the metadata 4000 recognizes that the expected count-up value (EC) is correct.

For example, in FIG. 14, when the metadata server 200 generates the metadata 4000 on 3/5 that is the real time, since an attack by a malicious third party has caused the metadata server 200 to synchronize with a fake time, the metadata server 200 erroneously recognizes that the metadata 4000 had been generated on 3/9.

Although the validity period 4004 in the metadata server 200 at this point is 3/10, since a relative time is not affected by the time server 300, the relative time is 5000.

The metadata server 200 refers to immediately-preceding ED_old of the metadata 4000 and recognizes that the number of elapsed days (N) is 5 days. The metadata server 200 further refers to immediately-preceding TSC_old and recognizes that the elapsed count (C) is 1000.

The metadata server 200 assumes that, if 5 days have actually elapsed, the relative time is to be counted up accordingly by 5000. The metadata server 200 verifies the relative time on the basis of the assumption, but since only 1000 has elapsed, the metadata server 200 recognizes that a fraud has been committed.

Figure 15:
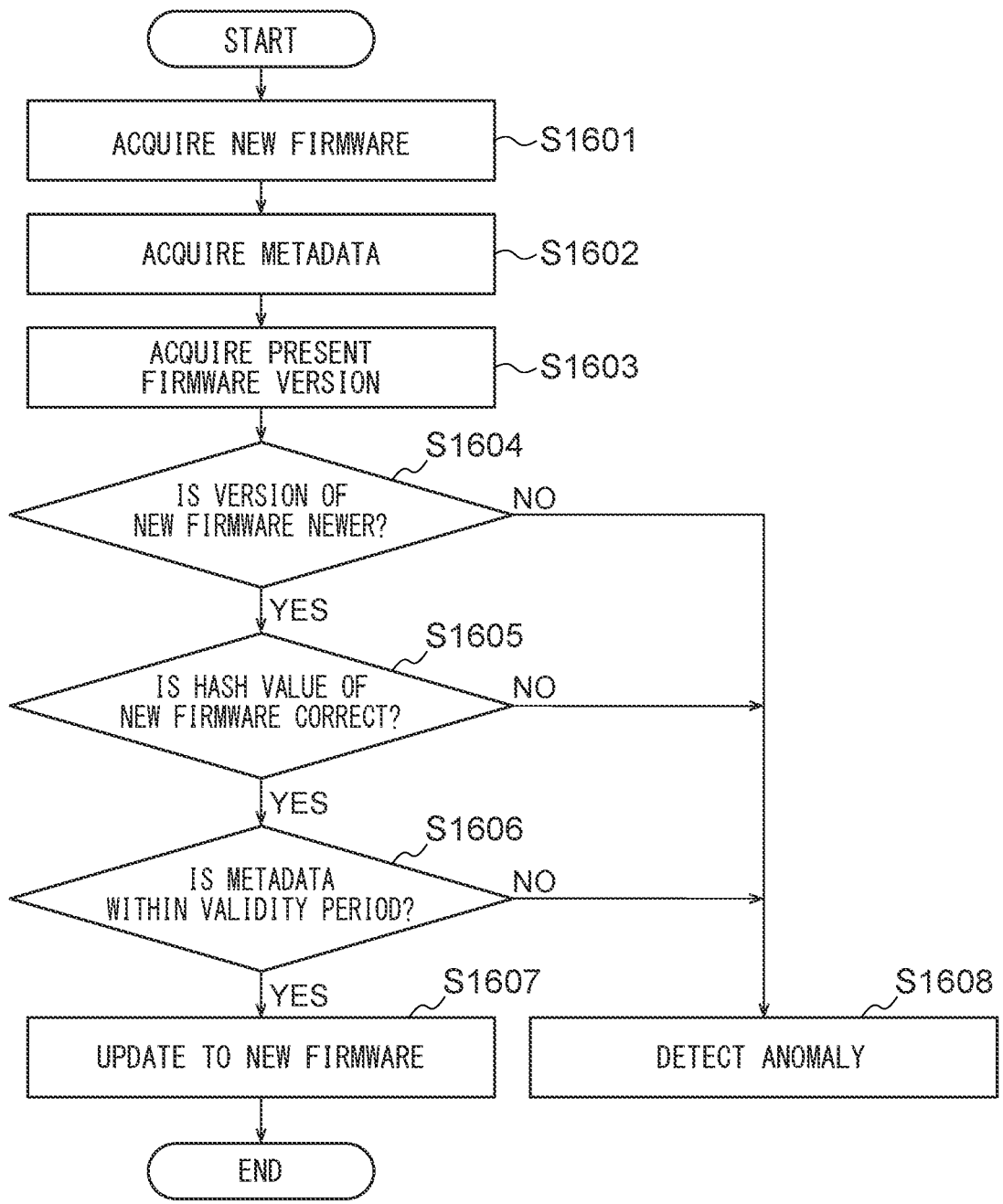
FIG. 15 is a flow chart showing a firmware update processing flow in a device.

FIG. 15 shows a firmware update processing flow in the device 1500.

The device 1500 acquires new firmware (S1601). Next, the device 1500 acquires the metadata 4000 of the new firmware (S1602).

The device 1500 acquires a firmware version that is running (S1603).

The device 1500 compares firmware versions (S1604).

When the version of the new firmware is newer than the version of the running firmware, a transition is made to S1605, but when the version of the new firmware is older or the same, a transition is made to S1608.

Accordingly, a downgrade can be prevented.

The device 1500 calculates an integrity verification hash value of the new firmware and compares the calculated integrity verification hash value with the integrity verification hash value 4003 of the metadata 4000 (S1605).

Accordingly, the device 1500 can confirm that the new firmware has not been falsified and that the new firmware is not counterfeit firmware unintended by the firmware developer.

Using the electronic signature set to the integrity verification hash value, the device 1500 also verifies that the integrity verification hash value 4003 of the metadata has not been falsified.

When the integrity verification hash value is correct, a transition is made to S1606, but if not, a transition is made to S1608.

The device 1500 verifies the validity period of the metadata 4000 (S1606).

The device 1500 compares the validity period 4004 with the absolute time of the device 1500. When the validity period has not expired, a transition is made to S1607, but when the validity period has expired, a transition is made to S1608.

In the comparison, the device 1500 also uses the electronic signature set to the validity period 4004 to verify that the entire piece of metadata 4000 including the validity period has not been falsified.

Accordingly, it can be confirmed that the metadata itself is not fake.

The device 1500 updates firmware to the new firmware (S1607).

The device 1500 detects that illegal processing has been performed or that the metadata 4000 is illegal and suspends the update processing (S1608).

As described above, according to the present embodiment, although only simple processing is performed on each of the validity period setting server 100, the metadata server 200, and the time server 300, when the servers operate in combination as the firmware verification server group 1100, the servers exhibit effects suitable for updating firmware.

Accordingly, even if any of the servers that make up the firmware verification server group 1100 is attacked by a malicious third party, damage to the firmware verification server group 1100 can be minimized by following a model of separating security authority.

Modification 1

Figure 16:
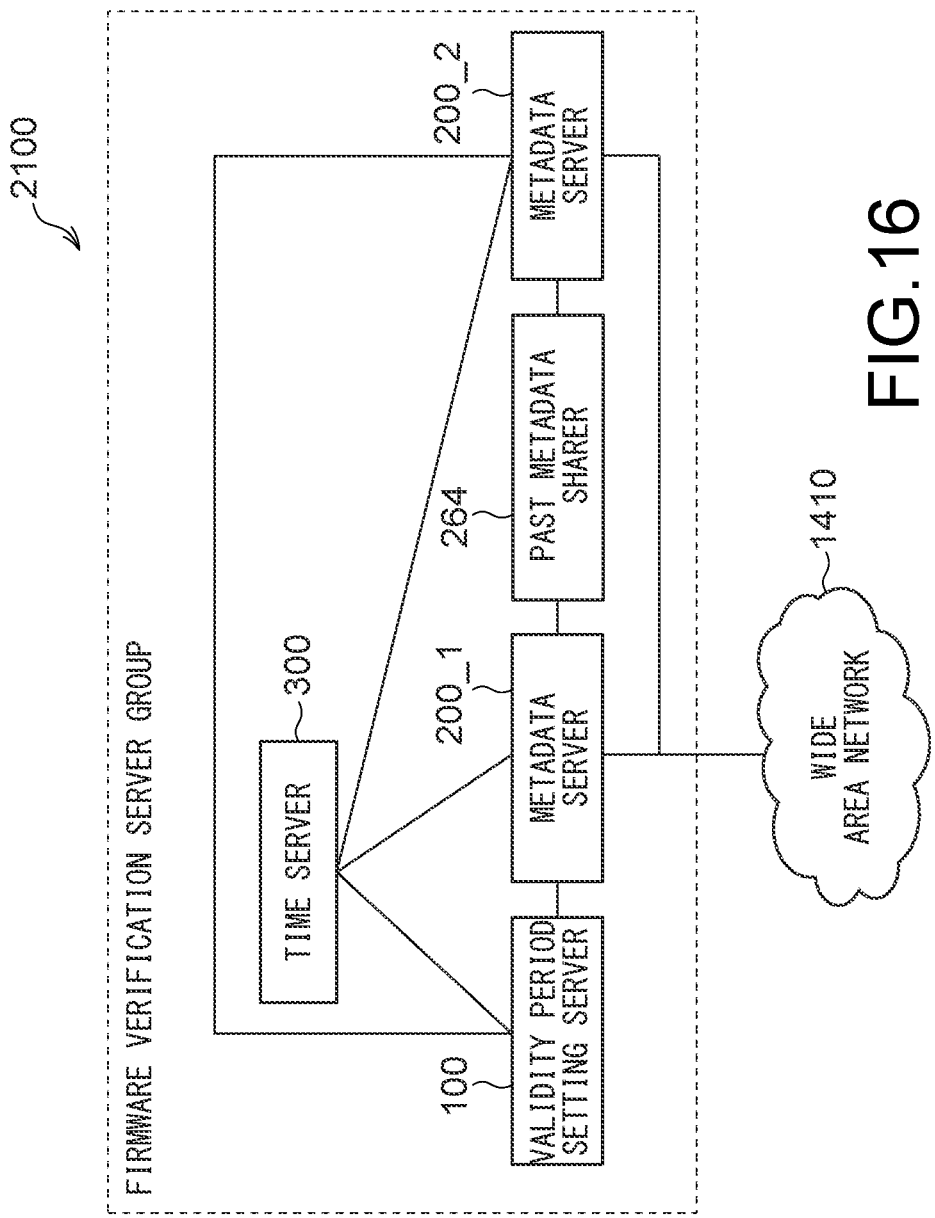
FIG. 16 is a diagram showing a configuration example of a modification of the present embodiment.

FIG. 16 shows a configuration example of a modification of the present embodiment.

The information processing system 1000 is operated by being made redundant in order to respond to cases where constituent servers abnormally stop due to unexpected events.

For example, by adopting a configuration in which the metadata server 200 is provided in plurality in the present embodiment, even if one metadata server 200 stops, a firmware verification server group 2100 and, by extension, the information processing system 1000 can remain operational.

The firmware verification server group 2100 includes two metadata servers 200_1 and 200_2.

The firmware verification server group 2100 connects a past metadata sharer 264 that stores metadata 4000 having been correctly sent in the past and the metadata servers 200_1 and 200_2 with each other.

Both metadata servers 200_1 and 200_2 can refer to data in the past metadata sharer 264.

Figure 17:
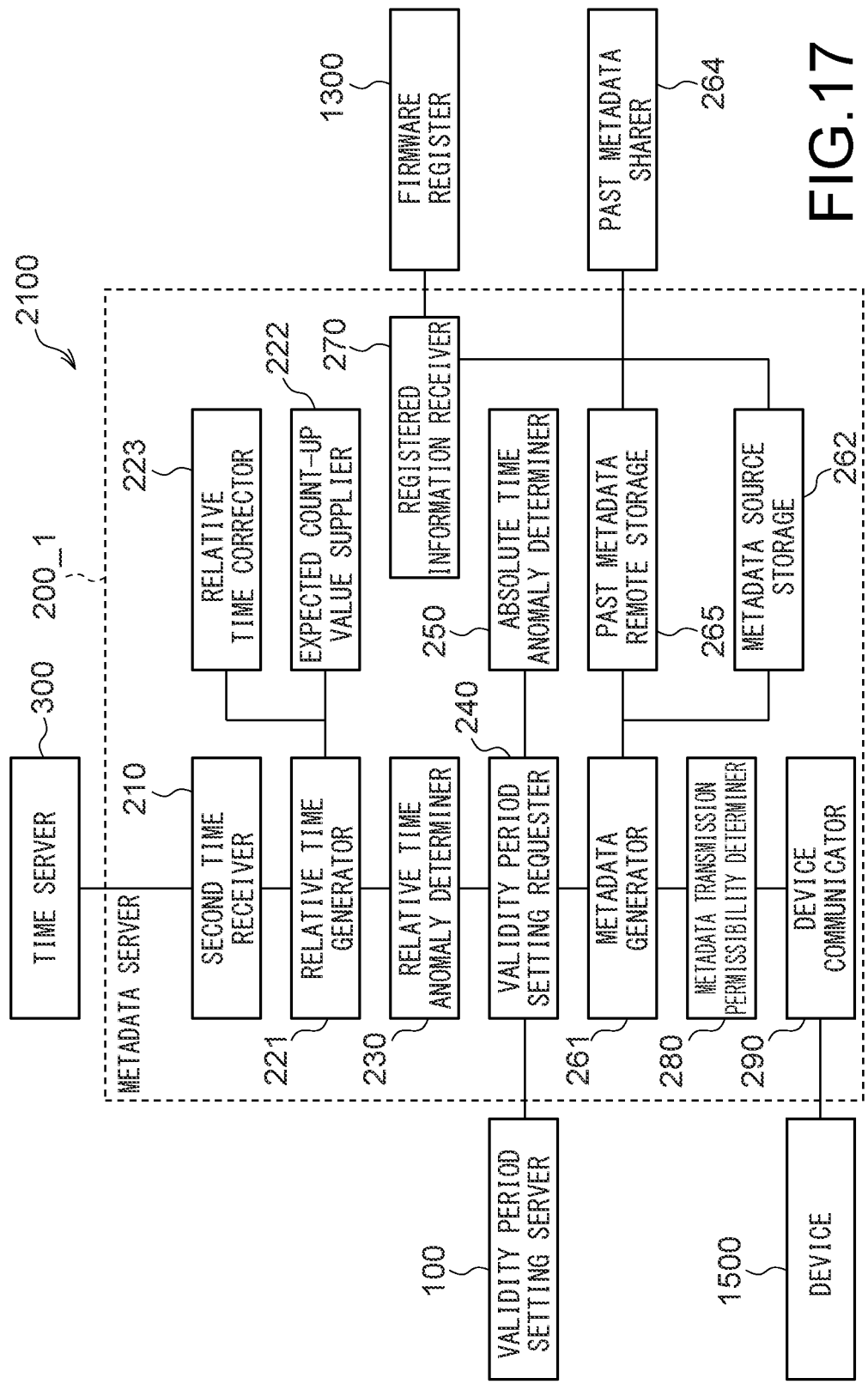
FIG. 17 is a diagram showing constituent elements of a metadata server according to the present modification.

FIG. 17 shows constituent elements of the metadata server 200_1 according to the present modification.

Since the metadata server 200_2 is configured in a similar manner to the metadata server 200_1, a description thereof will be omitted.

The metadata server 200_1 includes a relative time corrector 223 and a past metadata remote storage 265.

In an operation where the past metadata sharer 264 is transparently referred to by the metadata servers 200_1 and 200_2, synchronization of relative times between the metadata servers 200_1 and 200_2 is provided.

Since a relative time starts to monotonically increase from the time of activation of the metadata servers 200_1 and 200_2, when one of the computers involves a restart, a deviation is created which causes an inconsistency in operation.

The past metadata remote storage 265 is a communicator for storing, in the past metadata sharer 264, information on past metadata 4000 having been locally stored in the metadata servers 200_1 and 200_2.

Remote storage enables both metadata servers 200_1 and 200_2 to share past metadata.

The relative time corrector 223 functions as a counter corrector that corrects a relative time of the metadata server 200_1 by synchronizing the relative time of the metadata server 200_2 and a local relative time with each other.

The synchronization of relative times is processing that is performed only once when the metadata server 200_1 is activated.

Since the relative time is 0 at the time of activation, the metadata server 200_1 acquires the relative time of the metadata server 200_2 upon its own activation.

The metadata server 200_1 recognizes a sum of its own relative time and the relative time of the other metadata server as the relative time.

Figure 18:
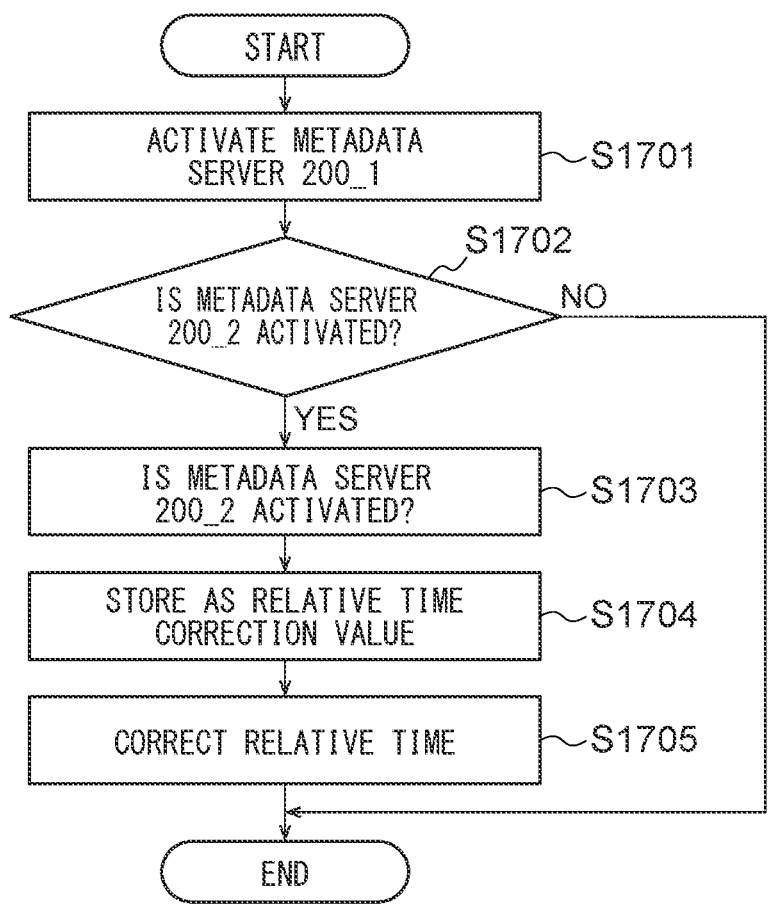
FIG. 18 is a flow chart showing relative time correction upon activation of a metadata server.

FIG. 18 shows relative time correction upon activation of the metadata server 200_1.

The metadata server 200_1 is activated and activation processing is executed (S1701).

The metadata server 200_1 determines whether or not the metadata server 200_2 has already been activated (S1702). When already activated, a transition is made to S1703, but when not already activated, since the metadata server 200_1 is the metadata server 200 activated first, synchronization of relative times is determined to be unnecessary and processing is terminated.

The metadata server 200_1 acquires a relative time from the metadata server 200_2 (S1703).

The metadata server 200_1 stores, in itself, the acquired relative time as a relative time correction value (S1704).

The relative time corrector 223 corrects the relative time to a value obtained by adding the relative time correction value to the relative time of the relative time generator 221 (S1705).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An information processing device, comprising:
   a metadata generator implemented by a computer configured to generate, based on an update request of firmware from a device, first metadata including identification information of the firmware, the first metadata being separated from the firmware;
   a time manager implemented by the computer configured to manage time;
   a validity period determiner implemented by the computer configured to determine a first validity period of the first metadata based on time acquired from the time manager;
   a counter configured to count up a value for each unit of time elapsed based on a clock oscillator;
   an acquirer implemented by the computer configured to acquire a first counter value being a value of the counter with respect to the first metadata;
   a storage configured to store one or more entries each including second metadata, a second validity period, and a second counter value, wherein the second metadata includes identification information of firmware, the second validity period is a validity period of the second metadata, and the second counter value is a value of the counter having been acquired with respect to the second metadata, the second metadata being separated from the firmware; and
   a determiner implemented by the computer configured to:
      (a) detect, from the one or more entries, an entry including the second metadata including same identification information as the identification information included in the first metadata,
      (b) acquire the second validity period and the second counter value from the detected entry, and
      (c) detect falsification of the first validity period based on the first counter value and the first validity period and the acquired second counter value and the acquired second validity period.

2. The information processing device according to claim 1, wherein
   the determiner is configured to:
      (c1) calculate an elapsed period being a difference between the first validity period and the acquired second validity period and an elapsed count being a difference between the first counter value and the acquired second counter value,
      (c2) calculate a value that is counted up during a time corresponding to the elapsed period based on a value that is counted up during the unit time of the counter, and
      (c3) detect the falsification by comparing the calculated value and the elapsed count with each other.

3. The information processing device according to claim 2, wherein
   the determiner does not detect the falsification if a difference between the value and the elapsed count is equal to or smaller than a threshold.

4. The information processing device according to claim 1, further comprising:
   a time receiver configured to receive time information distributed by a time server, wherein
   the time manager is configured to correct the time based on the time information.

5. The information processing device according to claim 4, wherein
   a falsification of the first validity period is triggered by a change to the distributed time information caused by an attack on the time server by a third party.

6. The information processing device according to claim 1, further comprising:
   a metadata transmission permissibility determiner configured to determine a permissibility of transmission of the first metadata based on a result of detection of falsification of the first validity period as determined by the determiner; and
   a device communicator configured to transmit the first metadata to the device when transmission of the first metadata is determined to be permissible.

7. The information processing device according to claim 1, further comprising:
   a metadata source storage configured to store identification information of the firmware, wherein
   the metadata generator is configured to generate the first metadata from the identification information stored in the metadata source storage.

8. The information processing device according to claim 1, wherein
   the identification information includes an identifier that uniquely identifies the firmware and an integrity verification hash value that verifies an integrity of the firmware.

9. The information processing device according to claim 8, wherein
   the identifier includes a firmware name and a firmware version of the firmware.

10. The information processing device according to claim 1, wherein
    the counter is configured to perform count-up using a CPU register.

11. The information processing device according to claim 1, comprising:
    at least two or more of the counter; and
    a counter corrector configured to correct the first counter value that is based on the counter, using the first counter value that is based on a different one of the counters.

12. The information processing device according to claim 1, wherein
    when a falsification of the first validity period is not detected by the determiner, a first entry including the first metadata, the first validity period, and the first counter value is stored in the storage.

13. The information processing device according to claim 12, wherein
    when the entry in which the second metadata includes same identification information as the identification information included in the first metadata is present in the storage, the storage is configured to overwrite the entry based on the first entry.

14. The information processing device according to claim 1, wherein
a falsification of the first validity period is triggered by a change to the time caused by an attack on the time manager by a third party.

15. An information processing system, comprising:
a first information processing device and a second information processing device, wherein
the first information processing device includes: a time manager implemented by a first computer configured to manage time; and a validity period determiner implemented by the first computer configured to determine, based on time acquired from the time manager and a request to update firmware from a device, a first validity period of first metadata including identification information of the firmware, and
the second information processing device includes: a metadata generator implemented by a second computer configured to generate the first metadata, the first metadata being separated from the firmware; a counter implemented by the second computer configured to count up a value for each unit of time elapsed based on a clock oscillator; an acquirer implemented by the second computer configured to acquire a first counter value being a value of the counter with respect to the first metadata; a storage configured to store one or more entries each including second metadata, a second validity period, and a second counter value, wherein the second metadata includes identification information of firmware, the second validity period is a validity period of the second metadata, and the second counter value is a value of the counter having been acquired with respect to the second metadata, the second metadata being separated from the firmware; and a determiner implemented by the second computer configured to:
(a) detect, from the one or more entries, an entry including the second metadata including same identification information as the identification information included in the first metadata,
(b) acquire the second validity period and the second counter value from the detected entry, and
(c) detect falsification of the first validity period based on the first counter value and the first validity period and the acquired second counter value and the acquired second validity period.

16. A non-transitory computer readable medium having a computer program stored therein which when executed by a computer, causes the computer to perform processes, comprising:
generating, based on an update request of firmware from a device, first metadata including identification information of the firmware, the first metadata being separated from the firmware;
managing time by a time manager;
determining a first validity period of the first metadata based on time acquired from the time manager;
counting up a value for each unit of time elapsed based on a clock oscillator;
acquiring a first counter value being a value of the counter with respect to the first metadata;
storing, in a storage, one or more entries each including second metadata, a second validity period, and a second counter value, wherein the second metadata includes identification information of firmware, the second validity period is a validity period of the second metadata, and the second counter value is a value of the counter having been acquired with respect to the second metadata, the second metadata being separated from the firmware;
detecting, from the one or more entries, an entry including the second metadata including same identification information as the identification information included in the first metadata;
acquiring the second validity period and the second counter value from the detected entry; and
detecting falsification of the first validity period based on the first counter value and the first validity period and on the acquired second counter value and the acquired second validity period.

* * * * *